United States Patent
DiLullo et al.

(10) Patent No.: US 6,729,405 B2
(45) Date of Patent: *May 4, 2004

(54) HIGH TEMPERATURE FLEXIBLE CEMENTING COMPOSITIONS AND METHODS FOR USING SAME

(75) Inventors: Gino A. DiLullo, Caracas (VE); Philip J. Rae, Landridge Condo (SG)

(73) Assignee: BJ Services Company, Houston, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/068,787

(22) Filed: Feb. 6, 2002

(65) Prior Publication Data

US 2002/0157575 A1 Oct. 31, 2002

Related U.S. Application Data

(60) Provisional application No. 60/269,153, filed on Feb. 15, 2001.

(51) Int. Cl.$^7$ .................... E21B 33/138; C04B 14/38; C04B 22/00
(52) U.S. Cl. .................... 166/292; 106/711; 106/819; 166/293
(58) Field of Search .................... 166/285, 292, 166/293; 106/692, 711, 713, 819

(56) References Cited

U.S. PATENT DOCUMENTS

| | | |
|---|---|---|
| 2,846,327 A | 8/1958 | Wood et al. |
| 3,563,313 A | 2/1971 | Spangle |
| 3,581,825 A | 6/1971 | Messenger |
| 3,887,385 A | 6/1975 | Quist et al. |
| 3,990,903 A | * 11/1976 | Mallow ............ 106/624 |
| 4,102,400 A | 7/1978 | Crinkelmeyer et al. |
| 4,132,555 A | 1/1979 | Barrable |
| 4,159,361 A | 6/1979 | Schupack |
| 4,202,413 A | 5/1980 | Messenger |
| 4,257,483 A | 3/1981 | Morris et al. |
| 4,274,881 A | 6/1981 | Langton et al. |
| 4,300,633 A | 11/1981 | Stewart |
| 4,328,036 A | 5/1982 | Nelson et al. |
| 4,478,640 A | 10/1984 | Holland |
| 4,482,379 A | 11/1984 | Dibrell et al. |
| 4,640,361 A | 2/1987 | Smith et al. |
| 4,655,286 A | 4/1987 | Wood |
| 4,902,170 A | 2/1990 | Knox et al. |
| 4,957,556 A | 9/1990 | Kunbargi |
| 4,967,839 A | 11/1990 | Carpenter et al. |

(List continued on next page.)

FOREIGN PATENT DOCUMENTS

| | | |
|---|---|---|
| GB | 0920446 A | 3/1963 |
| GB | 1469954 A | 4/1977 |

(List continued on next page.)

OTHER PUBLICATIONS

Hogg, "Comparison of Multilateral Completion Scenarios and Their Application," SPE 38493, Society of Petroleum Engineers, Inc.; Offshore Europe Conference held in Aberdeen, Scotland, Sep. 9–12, 1997.

(List continued on next page.)

Primary Examiner—George Suchfield
(74) Attorney, Agent, or Firm—O'Keefe, Egan & Peterman, LLP

(57) ABSTRACT

Natural fiber-containing cement compositions for cementing wellbores in high stress and high temperature environments. The cement compositions may contain natural mineral fiber materials such as wollastonite in an amount of greater than about 10% and in an amount selected to be effective to achieve ratios of flexural strength to compressive strength of cured cement that are greater than about 0.35 at downhole temperatures of greater than about 180° F.

19 Claims, 3 Drawing Sheets

U.S. PATENT DOCUMENTS

| | | | |
|---|---|---|---|
| 4,968,349 | A | 11/1990 | Virtanen |
| 5,028,271 | A | 7/1991 | Huddleston et al. |
| 5,058,679 | A | 10/1991 | Hale et al. |
| 5,106,423 | A | 4/1992 | Clarke |
| 5,125,455 | A | 6/1992 | Harris et al. |
| 5,158,613 | A | 10/1992 | Sargeant et al. |
| 5,159,980 | A | 11/1992 | Onan et al. |
| 5,183,506 | A | 2/1993 | Zhang |
| 5,271,469 | A | 12/1993 | Brooks et al. |
| 5,293,938 | A | 3/1994 | Onan et al. |
| 5,343,950 | A | 9/1994 | Hale et al. |
| 5,348,093 | A | 9/1994 | Wood et al. |
| 5,351,759 | A | 10/1994 | Nahm et al. |
| 5,421,409 | A | 6/1995 | Mueller et al. |
| 5,484,019 | A | 1/1996 | Griffith |
| 5,564,503 | A | 10/1996 | Longbottom et al. |
| 5,569,324 | A | 10/1996 | Totten et al. |
| 5,571,318 | A | 11/1996 | Griffith et al. |
| 5,588,488 | A | 12/1996 | Vijn et al. |
| 5,641,018 | A | 6/1997 | King |
| 5,660,625 | A | 8/1997 | Helmboldt et al. |
| 5,688,844 | A | 11/1997 | Chatterji et al. |
| 5,705,237 | A | 1/1998 | Andersen et al. |
| 5,711,383 | A | 1/1998 | Terry et al. |
| 5,711,801 | A | 1/1998 | Chatterji et al. |
| 5,779,787 | A | 7/1998 | Brothers et al. |
| 5,806,594 | A | 9/1998 | Stiles et al. |
| 5,851,960 | A | 12/1998 | Totten et al. |
| 6,145,591 | A | 11/2000 | Boncan et al. |
| 6,230,804 | B1 | 5/2001 | Mueller et al. |
| 6,554,067 | B1 * | 4/2003 | Davies et al. ............... 166/276 |

FOREIGN PATENT DOCUMENTS

| | | |
|---|---|---|
| GB | 2353523 | 2/2001 |
| GB | 2354236 | 3/2001 |
| JP | 10216628 A | 2/1997 |
| SU | 891891 | 12/1981 |
| SU | 1636367 A | 3/1991 |
| WO | WO 89/02878 | 4/1989 |
| WO | WO 98/54108 | 12/1998 |
| WO | WO 00/20350 | 4/2000 |
| WO | WO 00/37387 | 6/2000 |

OTHER PUBLICATIONS

Morsy, et al., "Microstructure and Hydration Characteristics of Artificial Pozzolana–Cement Pastes Containing Burnt Kaolinite Clay," Cement and Concrete Research, 27(9), 1307, 1997.

"MetaMax® High Reactivity Metakaolin (HRM) for Improved Pre–cast Concrete," Engelhard Corporation Pigments and Additives Group, C–8 E, Jan. 1997, 7 pages.

Thiercelin, et al. "Cement Design Based on Cement Mechanical Response," SPE 38598, Society of Petroleum Engineers, Inc.; SPE Annual Technical Conference and Exhibition held in San Antonio, Texas, Oct. 5–8, 1997.

Marsh, "An alternative to silica fume48 " Concrete Products, EC–6729, Nov. 1994.

"Horizontal Drilling: Multi–Lateral and Twinned Wells," Sperry–Sun Drilling Services, 1993.

Low, et al., "The Flexural Toughness and Ductility of Portland Cement–Based Binders Reinforced With Wollastonite Micro–Fibres," Cement and Concrete Research, 24(2), 250, 1994.

Low, et al., "Flexural Strength and Microstructure of Cement Binders Reinforced With Wollastonite Micro–Fibres," 10 pages.

Rieger, et al., "Talc, Pyrophyllite, and Wollastonite", pp 38–40, 42–44.

M–90–339 Silicate Portland Cement Admixture, Englehard Corporation, Specialty Minerals and Colors.

Ratinov, et al., "Chap. 8—Antifreezing Admixtures" in Concrete Admixtures Handbook, Properties, Science, and Technology, Edited by V. S. Ramachandran, pp. 430–463, 1984.

Ramachandran, V.S., "Concrete Admixtures Handbook Properties, Science, and Technology," Noyes Publications, Library of Congress No. 84–4125 (1984).

Caldarone et al., "High–Reactivity Metakaolin: A New Generation Mineral Admixture," 6 pages (authorized reprint from: Nov. 1994 issue of Concrete International).

Engelhard Corporation "MetaMax® EF High Reactivity Metakaolin (HRM) Pozzolanic Mineral Admixture" 2 pages (1997).

Engelhard "What Makes MetaMax® High Reactivity Metakaotin Stand Out? Let Us Enlighten You" 1 page, (1996).

Kuennen, "Metakaolin might" Concrete Products, 4 pages (May 1996).

Gruber et al., "Exploring The Pozzolanic Activity of High Reactivity Metakaolin," World Cement Research and Development, 6 pages (Feb. 1996).

Improve Cement–Based Products with High Reactivity Metakaolin 2 pages.

Khatib et al., "Sulphate Resistance of Metakaolin Mortar," Cement and Concrete Research, vol. 28, No. 1 pp. 83–92 (1998).

American Petroleum Institute, "Cement Sheath Evaluation" API Technical Report 10TR1 First Edition (Jun. 1996).

Thrush, "A dictionary of mining, mineral, and related terms," compiled and edited by Paul W. Thrush and the Staff of the Bureau of Mines, [Washington] U.S. Department of the Interior, Bureau of Mines, pp. 162, 606 and 696, (1968).

Suman, et al. "World Oil Cementing Hand Book" (1977).

Jutten, et al., Dowell Schlumberger, "Relationship Between Cement Composition, Mechanical Properties and Cement–Bond–Log Output", SPE 16652, pp. 75–82 (Feb. 1989).

Parcevaux, et al., "Cement Shrinkage and Elasticity: A New Approach for A Good Zonal Isolation" SPE 13176, (1984).

Goodwin, Mobil E&P Services Inc. and R.J. Crook, Halliburton Services, "Cement Sheath Stress Failure" SPE 20453 (Dec. 1992).

Carpenter, et al., Arco Oil & Gas Co., "Effects of Temperature and Cement Admixes on Bond Strength" SPE 22063 (May 31 1991).

Eilers, et al., "High Temperature Cement Compositions: Pectolite, Scawtite, Truscolite or Xonolite, Which Do You Want?" SPE 9286 (Jul. 1983).

Mueller, "An Evaluation of Well Cements for Use in High Stress Environments," Hart's Petroleum Engineer International, pp. 91–93 (Apr. 1998).

"MPA–3 Product Information," BJ Services Company Latin America Region (this reference was made available to the public prior to the Feb. 15, 2001 filing date of U.S. Provisional patent application No. 60/269,153, to which the present U.S. patent application Ser. No. 10/068,787 claims priority).

U.S. patent application Ser. No. 09/662,074 entitled "Compositions and Methods for Cementing Using Elastic Particles" by Brannon, et al. on Sep. 14, 2000 (BJSC:285).

K.R. Backe, "Characterizing Curing–Cement Slurries by Permeability, Tensile Strength and Shrinkage," SPE Drill & Completions 14, Norwegian U. of Science and Technology, Sep. 3, 1999, pp. 162–167.

"Well Cementing," Erik B. Nelson ed., Schlumberger Educational Services, Elsevier Science Publishing Company Inc., 1990, pp. 3–31 to 3–35.

U.S. patent application Ser. No. 09/664,490 entitled "Methods and Compositions for Use in Cementing in Cold Environments" by Go Boncan on Aug. 23, 2000 (BJSC:284).

* cited by examiner

SLURRY COMPOSITION "A" + 35% SILICA + 100% WOLLASTONITE @ 15.0 PPG

HIGH TEMPERATURE FLEXIBLE CEMENTING COMPOSITIONS AND METHODS FOR USING SAME

This application claims priority on co-pending U.S. provisional patent application serial No. 60/269,153 filed on Feb. 15, 2001, the disclosure of which is incorporated herein by reference in its entirety.

BACKGROUND OF THE INVENTION

1. Field of the Invention

This invention relates generally to methods and compositions for cementing, and more specifically to methods and flexible cement compositions for cementing in high stress and high temperature environments.

2. Description of Related Art

Cementing is a common technique employed during many phases of wellbore operations. For example, cement may be employed to cement or secure various casing strings and/or liners in a well. In other cases, cementing may be used in remedial operations to repair casing and/or to achieve formation isolation. In still other cases, cementing may be employed during well abandonment. Cement operations performed in wellbores under high stress conditions may present particular problems, among other things, difficulty in obtaining good wellbore isolation and/or maintaining mechanical integrity of the wellbore. These problems may be exacerbated in those cases where wellbore and/or formation conditions promote fluid intrusion into the wellbore, including intrusion of water, gas, or other fluids.

In a wellbore, cement may be used to serve several purposes. Among these purposes are to selectively isolate particular areas of a wellbore from other areas of the wellbore. For example, in primary cementing, cement is commonly placed in the annulus created between the outside surface of a pipe string and the inside formation surface or wall of a wellbore in order to form a sheath to seal off fluid and/or solid production from formations penetrated by the wellbore. This isolation allows a wellbore to be selectively completed to allow production from, or injection into, one or more productive formations penetrated by the wellbore. In other cases cement may be used for purposes including, but not limited to, sealing off perforations, repairing casing leak/s (including leaks from damaged areas of the casing), plugging back or sealing off the lower section of a wellbore, sealing the interior of a wellbore during abandonment operations, etc.

One important objective of a primary cement job is to provide good isolation between producing zones up to the surface and in a manner that will endure through the entire life of the well. No fluid movement, either gas or liquid, is normally desirable at any time through the cemented annulus. In this regard, possible paths for fluid movement in the annulus include the interface between cement/rock and cement/casing and the cement matrix. Cement adherence to the formation and casing is primary affected by cement shrinkage and by stress changes induced by down-hole variations on pressure and temperature, especially inside the casing but also at the formation.

Conventional well cement compositions are typically brittle when cured. These conventional cement compositions often fail due to stresses, such as compressional, tensile and/or shear stresses, that are exerted on the set cement. Wellbore cements may be subjected to shear and compressional stresses that result from a variety of causes. For example, stress conditions may be induced by relatively high temperatures and/or relatively high fluid pressures encountered inside cemented wellbore pipe strings during operations such as perforating, stimulation, injection, testing, production, etc. Stress conditions may also be induced or aggravated by fluctuations or cycling in temperature or fluid pressures during similar operations. Variations in temperature and internal pressure of the wellbore pipe string may result in radial and longitudinal pipe expansion and/or contraction which tends to place stress on, among other things, the annular cement sheath existing between the outside surface of a pipe string and the inside formation surface or wall of a wellbore. Such stresses may also be induced in cement present in other areas of the wellbore in the pipe.

In other cases, cements placed in wellbores may be subjected to mechanical stress induced by vibrations and impacts resulting from operations, for example, in which wireline and pipe conveyed assembly are moved within the wellbore. Hydraulic, thermal and mechanical stresses may also be induced from forces and changes in forces existing outside the cement sheath surrounding a pipe string. For example, overburden and formation pressures, formation temperatures, formation shifting, etc. may cause stress on cement within a wellbore.

Conventional wellbore cements typically react to excessive stress by failing. As used herein, "cement failure" means cracking, shattering, debonding from attached surfaces (such as exterior surfaces of a pipe string and/or the wellbore face), or otherwise losing its original properties of strength and/or cohesion. Stress-induced cement failure typically results in loss of formation isolation and/or wellbore mechanical integrity. This in turn may result in loss of production, loss of the wellbore, pollution, and/or hazardous conditions.

Injection or production of high temperature fluids may cause thermal expansion of trapped fluids located, for example, between a pipe string and a cement sheath, between a cement sheath and the formation, and/or within the cement sheath. Such trapped fluids may create excessive pressure differentials when heated and/or cooled, resulting in cement failure. Thermal cycling (such as created by intermittent injection or production of fluids that are very warm or cool relative to the formation temperature), typically increase the likelihood of cement failure.

In still other cases, mechanical and/or hydraulic forces exerted on the exterior of a cement sheath may cause stress-induced cement failure. Such forces include, but are not limited to, overburden pressures, formation shifting, and/or exposure to overpressured fluids within a formation. Increased pressure differential, such as may be caused when the interior of a cemented pipe string is partially or completely evacuated of liquid, also tends to promote cement failure, especially when combined with relatively high pressures exerted on the exterior of a cement sheath surrounding the cemented pipe string.

In addition, any type of thermal, mechanical or hydraulic stress that acts directly on a set cement composition, or which tends to cause deformation of a wellbore tubular in contact with a set cement composition may promote, or result in, failure of a conventional cement composition.

SUMMARY OF THE INVENTION

Natural fiber-containing cementing systems and methods are provided in which cement slurries may be formulated to provide hardened cement compositions possessing relatively high resilience, elasticity, and/or ductility at relatively high temperatures. In one embodiment, such hardened cement compositions may be characterized as having an increased ratio of flexural strength to compressive strength as compared to conventional cement compositions. As used herein, a "hardened cement composition" means a cured or set cement slurry composition.

The disclosed cement formulations may be advantageously used to cement wellbores in relatively high temperature environments where high stress resistance is required. These include oil/gas, water and geothermal wells in which high stress conditions exist or in which cement will be subjected to conditions of high stress including, but not limited to, those types of wellbores discussed above. Specific examples of such wells include, but are not limited to, wells having slimhole completions, highly deviated or horizontal wells, wells exposed to thermal and/or pressure cycling, high perforation density completions, wells completed in formations subject to relatively high overburden and/or fluid pressures, and wells having junction points between a primary wellbore and one or more lateral wellbores. Such cement systems are typically characterized by the ability to provide the ductility needed to withstand impacts and shocks of well operations and/or stresses induced by temperature and/or fluid production/injection, while at the same time providing relatively high compressive strength.

As disclosed herein, a natural fiber-containing cementing system may comprise a hydraulic cement, water, and at least one natural mineral fiber material, such as at least one fibrous calcium silicate material. Examples of suitable calcium silicate fibers include, but are not limited to, wollastonite pyrophillite, algamatolite, etc. or a mixture thereof Other cementing additives including, but not limited to, fibers, aluminum silicate (such as a metakaolin), fluid loss additives, set retarders, dispersants, etc. may also be optionally employed.

In one embodiment using the disclosed cement compositions containing natural mineral fiber material, a surprising increase in the ratio of flexural strength/compressive strength (i.e., above about 0.35) may be advantageously achieved at downhole temperatures above about 180° F., and particularly at downhole temperatures above about 240° F., with a fibrous mineral content (e.g., wollastonite) of from about 10% to about 150% by weight of base cement ("BWOC").

In one respect, disclosed is a method of cementing within a wellbore, including introducing a cement slurry including a hydraulic cement base and a natural mineral fiber into the wellbore; and allowing the cement slurry to cure within the wellbore to form a hardened cement composition within the wellbore; wherein a temperature of at least a first portion of the well bore is greater than about 180° F.; wherein the natural mineral fiber is present in the cement slurry in an amount greater than about 10% by weight of cement, and is also present in the cement slurry in an amount selected to be effective to result in at least a portion of the cured cement composition having a ratio of flexural strength to compressive strength that is greater than or equal to about 0.35 at the temperature of the at least a first portion of the well bore that is greater than about 180° F. Examples of natural mineral fibers that may be employed may include, but are not limited to, at least one of wollastonite, pyrophillite, algamatolite, or a mixture thereof.

In one embodiment of this method, the natural mineral fiber may be present in the cement slurry in an amount selected to be effective to result in at least a portion of the cured cement composition having a ratio of flexural strength to compressive strength that is greater than or equal to about 50% higher than the ratio of flexural strength to compressive strength of a cured conventional cement composition having substantially the same composition, but without the natural mineral fiber component, at the temperature of the at least a first portion of the wellbore that is greater than about 180° F.

In another embodiment of this method, a temperature of the at least a first portion of the well bore is less than about 180° F. when the cement slurry is introduced into the wellbore and allowed to cure; and further including allowing the temperature of the at least a first portion of the wellbore to rise above about 180° F.; wherein the natural mineral fiber is present in the cement slurry in an amount selected to be effective to result in an increase in the compressive strength of at least a portion of the cured cement composition when the temperature of the at least a first portion of the wellbore is allowed to rise above about 180° F.

In another embodiment, disclosed is a fiber-containing cement composition, comprising a hydraulic cement base and a natural mineral fiber; wherein said natural mineral fiber is present in an amount greater than about 10% by weight of cement; wherein said natural mineral fiber is also present in said fiber-containing cement composition in an amount selected to be effective so as to result in cement slurry and a cured cement composition formed from said cement slurry having a ratio of flexural strength to compressive strength that is greater than or equal to about 0.35 when said cement slurry is exposed to a temperature of greater than about 180° F.; and wherein said natural mineral fiber comprises at least one calcium silicate natural mineral fiber.

DESCRIPTION OF ILLUSTRATIVE EMBODIMENTS

Figure 1:
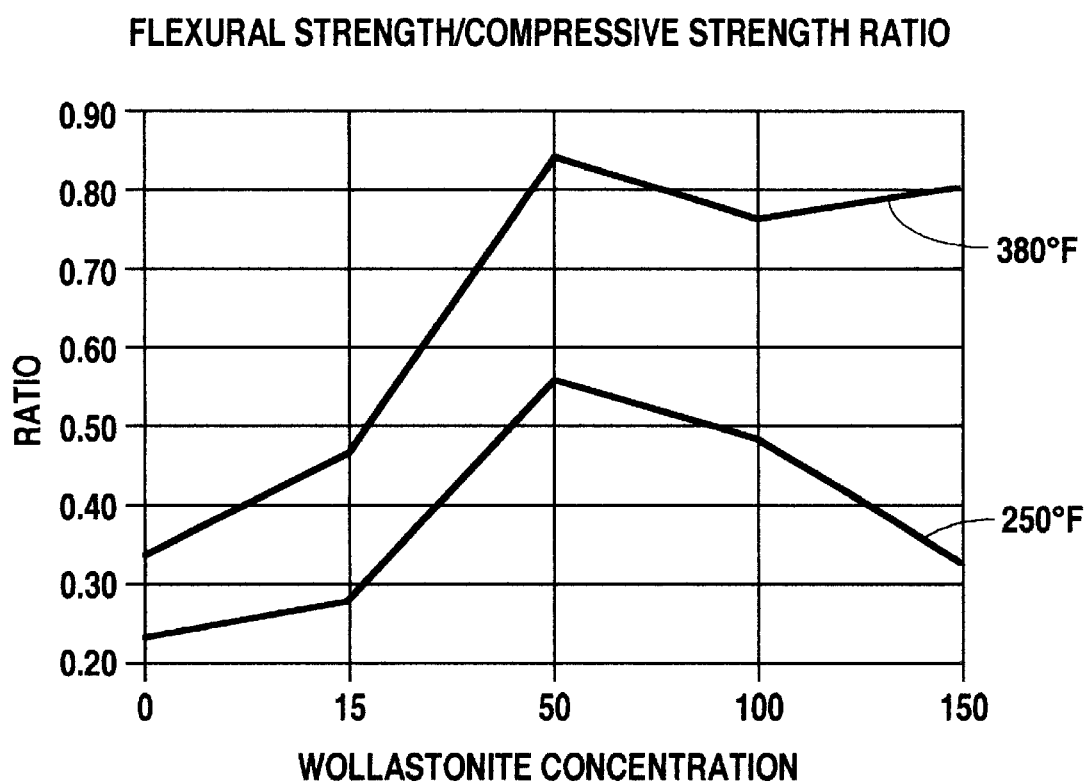
FIG. 1 illustrates ratio of flexural strength to compressive strength as a function of temperature and wollastonite concentration in cement.

The disclosed natural fiber-containing cement systems may contain natural mineral fibers such as wollastonite, pyrophillite, algamatolite, mixtures thereof, etc. These cementing systems are useful for, among other things, cementing operations performed in wellbores having conditions prone to stress-induced cement failure. As used herein "wellbore stress" includes compressive, tensile and/or shear stresses (such as from shifting formations) that may be experienced by a hardened cement slurry in a well or wellbore. Such wellbore stress conditions include those described elsewhere herein. In particular, the disclosed cement systems are useful in cementing operations performed in wellbores subject to mechanical, hydraulic and/or thermally induced stresses. Although benefits of the disclosed cement compositions and systems may be realized in any type of well cementing situation, these compositions are particularly suitable for use in wells in which conditions of high stress are present or in which cement will be subjected to conditions of high stress including, but not limited to, lateral completions, multi-lateral completions, horizontal wellbores, wellbores for conducting relatively high temperature and/or high pressure fluids, wellbores subjected to high overburden stress or formation shifting, deviated or horizontal wells, wells having one or more doglegs or sidetrack segments, slimhole completions, wells exposed to thermal and/or pressure cycling, wellbores having relatively high perforation densities, etc.

The disclosed natural fiber-containing cement compositions may be employed in wells exposed to high temperatures. These include, but are not limited to, wells completed in deep and/or high temperature formations with high temperature fluids, wells used in geothermal applications, wells used in injection schemes where high temperature fluids are injected into a formation (such as steam flood wells, cyclic steam injection wells, etc.), and wells used for producing relatively high temperature fluids (such as fire floods). High temperatures and thermal cycling tend to induce stress on set cement by causing, among other things, linear and radial expansion and/or contraction of wellbore tubulars.

Surprisingly, the addition of natural mineral fibers (e.g., wollastonite, pyrophillite, algamatolite, etc.), may be used to produce cured ductile/flexible cements having ratios of flexural strength to compressive strength of greater than about 0.30, alternatively greater than about 0.31, alternatively greater than about 0.32, alternatively greater than about 0.33, alternatively greater than about 0.33, alternatively greater than about 0.34, alternatively greater than about 0.35, alternatively greater than about 0.40, alternatively greater than about 0.50, alternatively greater than about 0.60, alternatively greater than about 0.70, and further alternatively greater than about 0.80 at relatively high downhole temperatures. In this regard, the disclosed cement compositions may be particularly advantageously employed in wellbores having bottom hole temperatures greater than about 180° F., alternatively in wellbores having bottom hole temperatures of greater than about 240° F., alternatively in wellbores having bottom hole temperatures of greater than about 250° F., alternatively in wellbores having bottom hole temperatures of greater than about 300° F., alternatively in wellbores having bottom hole temperatures of greater than about 380° F., and further alternatively in wellbores having bottom hole temperatures of greater than about 400° F.

It will be understood, however that the compositions may be beneficially employed in wells having bottom hole temperatures less than or equal to about 180° F. as well. Further, it will be understood that the benefits of the disclosed compositions may be obtained whether the above-given bottom hole temperatures are the static bottom hole temperature, or a temporary or cyclic elevated temperature induced by production or injection operations within a wellbore. Example 1 gives exemplary data regarding calculation of flexural strength to compressive strength ratios. It should be noted that conventional cements compositions without the disclosed mineral fiber materials typically have flexural strength to compressive strength ratios of less than about 0.30, and typically average around about 0.25.

In another embodiment, the disclosed compositions may be employed in wellbores in which thermal cycling occurs. By "thermal cycling" it is meant that a given point of a wellbore is subjected to relatively large magnitude changes or swings in temperature, such as may be encountered during intermittent injection or production of relatively high temperature or low temperature fluids. In this regard, the disclosed cement compositions may be particularly advantageously employed in wells in which at least a portion of the wellbore is subjected to recurrent or cyclic temperature changes of greater than about 50° F., alternatively to recurrent or cyclic temperature changes of greater than about 100° F., alternatively to recurrent or cyclic temperature changes of greater than about 150° F., and further alternatively to recurrent or cyclic temperature changes of greater than about 200° F., although the compositions may be beneficially employed in wells having cyclic temperature changes of equal to or less than about 100° F. as well.

In another embodiment, benefits of the disclosed natural fiber-containing cement compositions may be realized in any well in which a high pressure differential exists between the interior of the pipe string and the wellbore face, or in which pressure cycling or pressure swings occur. Examples of such situations include those in which relatively high pressure well stimulation treatments (such as hydraulic fracturing treatments) are performed, or in which high temperature production operations cause relatively high annular pressures to develop. In other cases, such conditions may exist where wellbores penetrate overpressured formations, and/or in which a wellbore may be partially or completely evacuated during completion or production or later operations. In any event, the disclosed stress-resistant cement compositions may be particularly advantageously employed when used in wellbores in which a pressure differential of greater than about 2000 psi exists between the interior of the pipe string and the wellbore face, more advantageously employed when used in wellbores in which a pressure differential of greater than about 3500 psi exists between the interior of the pipe string and the wellbore face, and most advantageously employed when used in wellbores in which a pressure differential of greater than about 5000 psi exists between the interior of the pipe string and the wellbore face, although benefits may also be realized at pressure differentials equal to or less than about 2000 psi as well. The effects of such high pressure differentials may be further exacerbated by cycling of the pressure, such as may be encountered when periodic high pressure well treatments are performed. In this regard, the disclosed cement compositions may be particularly advantageously employed in wellbores subjected to recurrent or cyclic pressure changes of greater than about 1000 psi, alternatively to recurrent or cyclic pressure changes of greater than about 2000 psi, and further alternatively to recurrent or cyclic pressure changes of greater than about 3000 psi, although the compositions may be beneficially employed in wells having cyclic pressure changes equal to or less than about 1000 psi in magnitude as well.

The preceding embodiments represent only a few of the many wellbore situations in which well cements may be subjected to relatively high mechanical, thermal or hydraulic induced stresses. In this regard, they are exemplary only. It will therefore be understood that benefits of the disclosed natural fiber-containing cement compositions may be realized in any wellbore cementing application in which a cured or set cement is subjected to relatively high mechanical, thermal or hydraulic stresses. Such wellbore situations include, but are not limited to, annular cement sheaths existing between pipe strings (such as a liner cemented within another string of casing or tie-back strings), expandable packers inflated with cement, and/or cement employed to repair casing damage or isolate perforations (such as squeeze cementing). Other examples of wellbore cementing in which high stresses may be encountered include, but are not limited to, cement plugbacks (especially where high pressure differentials and/or mechanical shocks are encountered). Other examples include lateral and/or multi-lateral wellbores having one or more secondary lateral wellbores extending from a primary wellbore. Further information on sources and causes of stress that may be induced in wellbore cements may be found in Thiercelin et al., "Cement Design Based on Cement Mechanical Response", SPE Paper 38598, pp. 1–23, Oct. 5–8, 1997, which is incorporated herein by reference. Further information about lateral and multi-lateral completions may be found in Hogg, "Comparison of Multilateral Completion Scenarios and Their Application," SPE 38493, pp. 17–27, Sep. 9–12, 1997, which is incorporated by reference herein.

In the practice of the disclosed method and compositions, natural fiber minerals may be combined with a suitable hydraulic cement or mixture of hydraulic cements and an aqueous base fluid to form a cementing slurry. In this regard, any hydraulic cement or mixture of hydraulic cements suitable for wellbore cementing and compatible with a chosen fibrous mineral material may be employed. Examples of suitable hydraulic cement types include, but are not limited to, known hardenable cementitious materials comprising, for example, aluminum, silicon, calcium, oxygen, sulfur or mixtures thereof. More specifically, suitable hydraulic cements include gypsum cements, silica cements, high aluminum content cements, blast furnace slag-based cements, pozzolona type cements, Portland cements, high alkalinity cements, etc. These hydraulic cements may be used alone or in mixtures. Portland cements are often employed. Typical Portland cements include, but are not limited to, ASTM Type I, II, III, IV and/or V Portland cements, and API Class A, B, C, G and/or H Portland cements. However, it will be understood with benefit of this disclosure that other cements and cements containing other additives may also be suitably employed, including those described elsewhere herein. In this regard, a suitable hydraulic cement type or mixture of hydraulic cement types may be selected based on anticipated downhole conditions, such as temperature, with benefit of this disclosure using methods known in the art.

In the practice of the disclosed method, natural mineral fibers may be mixed or otherwise combined with a hydraulic cement, water, and/or other desired additives in any order suitable for forming a natural fiber-containing cement slurry. A suitable hydraulic cement may be mixed with various admixtures including, but not limited to, pozzolan, blast furnace slag, hollow microspheres, nitrogen, and mixtures thereof.

Examples of natural mineral fibers include, but are not limited to, carbonate or silicate minerals having a fibrous, aggregate crystal structure. The term "silicate" as used herein refers to those compounds containing silicon, oxygen, and one or more metals. Specific examples of suitable fibrous minerals include wollastonite, brucite, trona, sillimanite, sepiolite and pyrophyllite. Specific examples of suitable fibrous silicate minerals include wollastonite, sillimanite, sepiolite and pyrophyllite. Further information on fibrous minerals may be found in U.S. Pat. No. 5,421,409, and in U.S. Pat. No. 6,230,804, each of which is incorporated by reference herein in its entirety.

A fibrous mineral-containing cement slurry may contain natural fibrous mineral in a suitable hydraulic cement such as described elsewhere herein. In this regard, any fibrous mineral suitable for mixture with a hydraulic cement and suitable for increasing ratio of flexural strength to compressive strength of a cured cement composition to a value of about 0.35 or above at downhole temperatures greater than about 180° F. may be employed. Examples include those mineral fibers having calcium and silicate components, for example, calcium metasilicate natural mineral fibers. In one embodiment, wollastonite may be employed. Wollastonite is a natural occurring calcium metasilicate mineral which may be found, for example, in metamorphic rock formations in New York and California. Wollastonite is an acicular fiber which tends to form a fibrous, crystalline structure in its aggregate or polycrystalline form. Wollastonite is typically available as very fine or micro-fibers having diameters similar to that of particles of cement (typically from about 25 to about 40 $\mu$m) and a fiber length of typically from about 0.4 to about 0.6 mm. Wollastonite fibers typically are available in the shape of a acicular particles.

In the formulation and use of the various cement composition and embodiments disclosed herein, any specific type of wollastonite suitable for obtaining the desired properties of each embodiment under individual well conditions may be employed. Suitable wollastonites include, but are not limited to, wollastonite commercially available as "VANSIL W-10", available from R.T. Vanderbilt Company of Norwalk, Conn. "VANSIL W-10" may be characterized as acicular shaped micro fibers having fiber lengths of about 0.4–0.6 mm and fiber diameters of about 25–40 $\mu$m, is composed of calcium silicate, having the characteristic of 97.3% passing through a 200 mesh screen, a pH of about 10, and a specific gravity of about 2.9. Other suitable wollastonites include, but are not limited to, wollastonite available as NYAD G grade from Prescott & Co. of Mississauga, Ontario, Canada. In one embodiment a wollastonite having between about 40% and about 55% CaO and between about 60% and about 45% $SiO_2$, and alternatively having about 44% CaO and about 50% $SiO_2$ may be employed, although it will be understood with benefit of this disclosure that wollastonites having less than about 40% or greater than about 55% CaO, and having greater than about 60% or less than about 45% $SiO_2$ may be employed as well.

Another suitable type of wollastonite material is a fine mineral wollastonite-based fiber material available from Mineracao Sao Judas LTDA, Sao Paulo, Brazil; and that is available from the Latin American Region of BJ Services as "MPA-3." This wollastonite has a specific gravity of about 2.95, is about 75% active, and also contains MgO. In one embodiment, it is functional over a temperature range of at least from about 0° C. to about 204° C. It may be employed in foamed lightweight, normal and/or heavyweight cement designs. Among the many advantageous properties offered by the disclosed cement compositions containing fine wollastonite mineral fibers are reduced permeability, enhanced flexural strength development, increased sulfate resistance, minimization of gas migration through the cement matrix, excellent compressive strength development at temperatures above about 230° F., and/or production of cement with up to three times higher flexural strength/compressive ratios over comparable cement compositions absent the disclosed mineral fiber additive.

Figure 4:
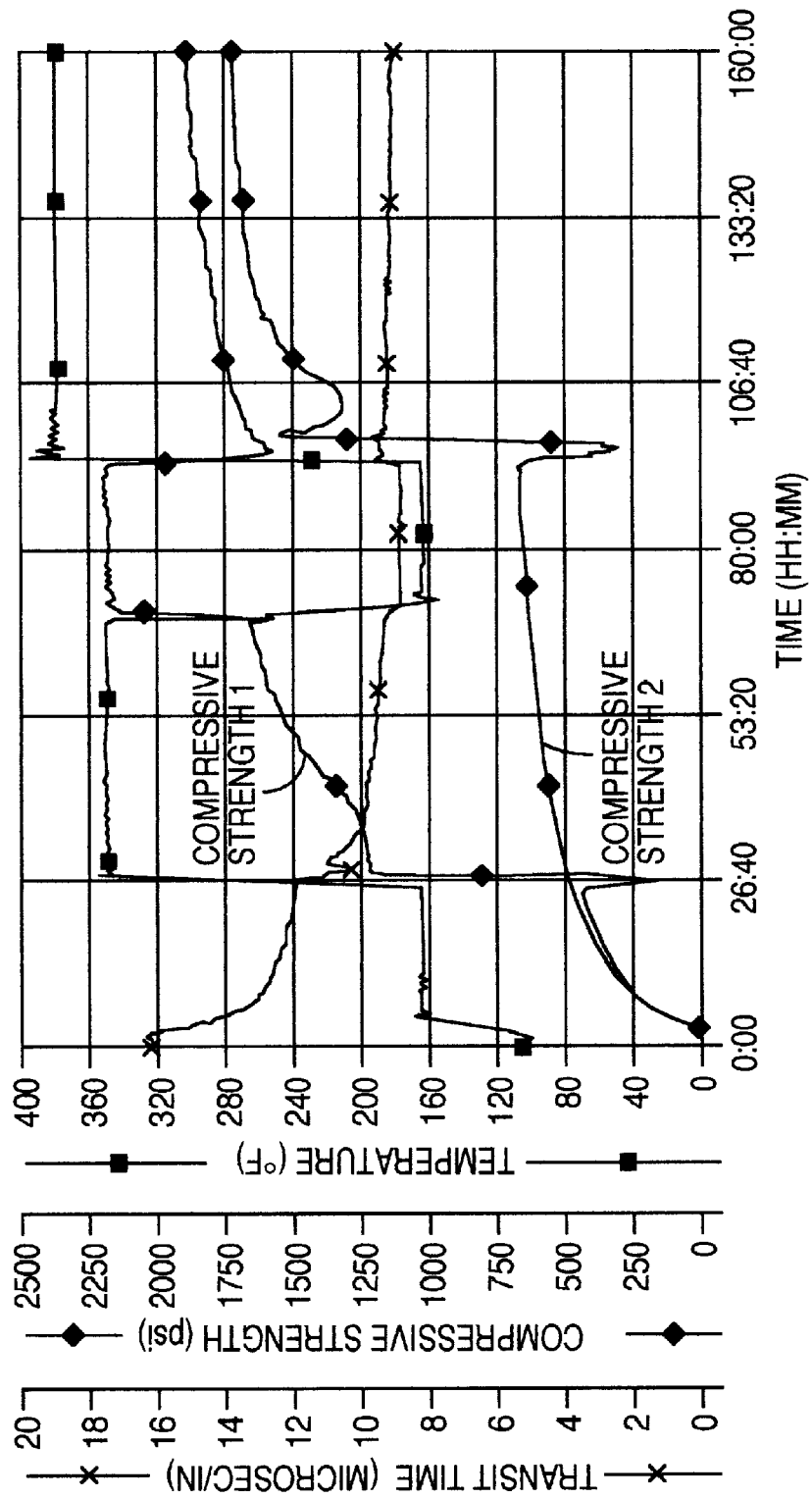
FIG. 4 illustrates values of compressive strength for a wollastonite-containing cement as a function of time and temperature.

In the practice of the various embodiments of the disclosed method, any amount of natural mineral fiber material suitable for achieving the surprising and advantageous increased ratio of cement flexural strength to compressive strength of the disclosed cement compositions described herein may be employed. As shown in Example 2 and FIG. 1, surprisingly increased ratios of flexural strength to compressive strength may be obtained using natural mineral fiber (e.g., wollastonite) concentrations of greater than about 10% BWOC, alternatively greater than about 12% BWOC, alternatively greater than about 15% BWOC at elevated temperatures (e.g., in FIG. 2 at temperatures greater than about 250° F. and greater than about 380° F.). As shown in FIG. 4, additions of amounts of natural mineral fiber at concentrations described herein exhibit increasingly advantageous flexural strength to compressive strength ratios with increasing temperature.

In various specific embodiments, amount of natural mineral fiber present in the disclosed cement compositions for use at the relatively high temperatures disclosed herein may be greater than about 10% BWOC, alternatively greater than about 15% BWOC, alternatively greater than about 20% BWOC, alternatively greater than about 25% BWOC, alternatively greater than about 30% BWOC, alternatively greater than about 35% BWOC, alternatively greater than about 40% BWOC, alternatively greater than about 45% BWOC, and further alternatively greater than about 50% BWOC. In yet other embodiments, amount of natural mineral fiber present in the disclosed cement compositions for use at the relatively high temperatures disclosed herein may be from about 10% BWOC to about 150% BWOC, alternatively from about 15% BWOC to about 150% BWOC, alternatively from about 20% BWOC to about 150% BWOC, alternatively from about 25% BWOC to about 150% BWOC, alternatively from about 30% BWOC to about 150% BWOC, alternatively from about 35% BWOC to about 150% BWOC, alternatively from about 40% BWOC to about 150% BWOC, alternatively from about 45% BWOC to about 150% BWOC, and further alternatively from about 50% BWOC to about 150% BWOC. In yet other embodiments, amount of natural mineral fiber present in the disclosed cement compositions for use at the relatively high temperatures disclosed herein may be from about x % BWOC to about y % BWOC, where for each respective embodiment the value of x may be selected from the range of values of from 10 to 149, and a corresponding value of y may be selected from the range of values of from 11 to 150, with the proviso that y is always greater than x for a given embodiment. It will be understood with benefit of this disclosure, however, that these compositional ranges are exemplary only, and that other amounts and ranges of amounts of natural mineral fiber may be beneficially employed.

Aluminum silicate is an additive that may be optionally employed in the disclosed compositions. In this regard, any aluminum silicate composition suitable for mixture with a hydraulic cement may be employed. In one example, aluminum silicate may be comprised of $SiO_2/Al_2O_3/Fe_2O_3$. An aluminum silicate additive may be kaolin or kaolinite, calcined kaolin or kaolinite (metakaolin), or mixtures thereof. Such aluminum silicate may also be referred to as China Clay. Other suitable forms of aluminum silicate include, but are not limited to, halloysite, dickite, and nacrite, and mixtures thereof, as well as mixtures of these with materials with kaolin and/or metakaolin. Hydrous form of kaolin is available from Thiele Kaolin Company.

Further information on suitable aluminum silicates may be found in "*Textbook of Lithology*" by Jackson, K. C., 1970, McGraw-Hill, Library of Congress No. 72-95810 which is incorporated herein by reference. As explained in this reference, in one example kaolins structurally may consist of a sheet of silicon-oxygen tetrahedra coordinated with a sheet of aluminum-oxygen-hydroxide octahedra. The resultant double sheet is typically electrostatically neutral so that no additional ions are required. The various minerals of the group may differ in the stacking patterns of these double sheets.

Aluminum silicates may have the content of silica may be between about 75% and about 25%, alternatively between about 65% and about 52% by weight, and the content of alumina may be between about 25% and about 75%, alternatively between about 35% and about 48% by weight respectively, although other silica and alumina contents are possible, including silica contents greater than about 75% and less than about 25% by weight, and alumina contents less than about 25% and greater than about 75% by weight. Aluminum silicates may contain trace amounts of ferric oxide. In this regard, any ferric oxide fraction present may be present in an amount less than about 1% by weight of aluminum silicate, although fractions greater than about 1% are also possible.

Aluminum silicate may have a particle size of between about 0.5 $\mu$M and about 2 $\mu$M and a specific gravity of greater than or equal to 2.2, and alternatively of about 2.5, although sizes and specific gravities outside these ranges are also possible. In this regard, smaller or more fine particles of aluminum silicate may be useful in situations requiring greater reactivity. Aluminum silicate may be employed in the form of kaolin or calcined anhydrous kaolin (metakaolin), such as metakaolin or high reactivity metakaolin ("HRM"). Examples of HRM aluminum silicates include, but are not limited to, those commercially available as "METAMAX" and, in finer form, as "METAMAX EF", both available from Engelhard Corporation, Specialty Minerals and Colors of Iselin, N.J. "METAMAX" may be characterized as calcined anhydrous Kaolin $Al_2O_3 \cdot SiO_2$, and has an average particle size of about 1.5 $\mu$M, is composed of 97% $SiO_2+Al_2O_3+Fe_2O_3$, with a specific gravity of about 2.5, a maximum wet screen residue of about 0.35% at +325 mesh, a pH of about 4.5–6.5, a maximum free moisture content of about 1.0, a loose bulk density of about 18 lbs/ft$^3$, a tamped bulk density of about 32 lbs/ft$^3$, and a specific gravity of about 2.5. In comparison, "METAMAX EF" has an average particle size of about 0.5 $\mu$M, is composed of 98% $SiO_2+Al_2O_3+Fe_2O_3$, and has a specific gravity of about 2.5, with a similar pH and free moisture content as "METAMAX." It will be understood with benefit of this disclosure that "METAMAX" and "METAMAX EF" are merely given as specific examples of suitable aluminum silicates, and that other aluminum silicates may be employed as well.

In the practice of the disclosed method, natural mineral fibers may be mixed with hydraulic cement to form a fiber-containing cement system or composition. To form a cement slurry, fiber-containing cement system or composition may be mixed with fresh water, but may also be mixed with sea water or any other suitable aqueous-based fluid including but not limited to formation brine, KCl water, NaCl water, sea water, drill water, drilling mud or mixtures thereof. However, it will be understood with benefit of the present disclosure that one or more natural mineral fibers may be added at any point in a cement slurry mixing process, including after a hydraulic cement has been mixed with an aqueous based fluid, and/or optionally mixed with an aqueous base fluid prior to mixing with a hydraulic cement.

The water requirement of a cement slurry may be varied to achieve desired density and pumpability. In this regard any amount of water suitable for forming a natural mineral fiber-containing cement slurry suitable for placement in a wellbore may be employed. For example, in one embodiment, a natural fiber-containing cement slurry density may be formulated to be between about 11 lbm/gal and about 19 lbm/gal, alternatively between about 16.0 lbm/gal and about 15.0 lbm/gal, and further alternatively from about 15.5 lbm/gal to about 16.5 lbm/gal. However, any other slurry density suitable for use in a wellbore may be employed, including less than about 11 lbm/gal or greater than about 19 lbm/gal. The system may also be formulated with lightweight additives including, but not limited to, additives such as microspheres and/or foamed with nitrogen gas or other suitable energizing phase to achieve lower densities, for example, to obtain densities as low as about 0.96 g/cm$^3$ (8 lbm/gal).

In embodiments of the disclosed methods and compositions, other additives, including any suitable cementing additives known to those of skill in the art may be employed in the formulation of a natural fiber-containing cement slurry. Optional additives may be used, for example, to further vary characteristics of a natural fiber-containing cement slurry, including to further vary viscosity, further control fluid loss, further immobilize water between particles, to further impart variable thixotropic properties to a cement slurry, to vary transition time, etc. Examples of possible additives include, but are not limited to, accelerators, dispersants, viscosifiers, fluid loss control agents, set retarders, low density additives, weighting agents, thinners, foamers, lost circulation materials, energizing gases (such as nitrogen gas, air, etc.). Thus, a cement slurry may be formulated, for example, to meet a given situation and to provide a reduced transition time while at the same time providing a density compatible with formation pressure gradients in order to avoid cement loss to the formation. For example, embodiments of the disclosed cement slurries may include lesser amounts of accelerator additives for use at relatively higher downhole temperatures.

In one embodiment, one or more additives suitable for decreasing transition time may optionally be employed. Examples of such additives include gypsum, calcium chloride, sodium silicate, metasilicate, metakaolin, or mixtures thereof. As a particular example, a natural fiber-containing cement may include between about 1% and about 15%, and alternatively between about 1% and about 10% gypsum BWOC, such as "A-10" gypsum available from BJ Services. However, amounts greater than about 15% gypsum BWOC and less than about 1% gypsum BWOC are also possible.

A cement slurry embodiment may also include optional cement fluid loss control additives, especially when low pressure or "thief" zones are suspected to be present. Such additives include any additive/s suitable for controlling fluid loss from a cement slurry prior to setting. Typical fluid loss control additives include, but are not limited to, materials such as hydroxyethyl cellulose ("HEC"), HEC blends, carboxymethyl hydroxyethyl cellulose ("CMHEC"), CMHEC blends, polyethylene imine ("PEI"), copolymers of acrylamide and acrylic acid, polyvinyl alcohol ("PVA"), PVA blends, etc. Other examples of suitable additives include, but are not limited to, 2-acrylomido, 2-methyl propane sulfonic acid, ("AMPS") copolymers, terpolymers or mixtures thereof. Other fluid loss control additives may also be employed. Such fluid loss control additives may be employed in an amount of from about 0.1% to about 3%, alternatively from about 0.1% to about 2%, and in one embodiment in an amount of from about 0.1% to about 1.5% BWOC, although other amounts (such as amounts greater than about 3% BWOC) are also possible. In one embodiment, between about 0.1% and about 3.0%, and alternatively from about 0.1% to about 1.5% of "FL-33" fluid loss control additive BWOC (available from BJ Services) may be employed.

Any additive/s suitable for controlling fluid flow may also be optionally employed including, but not limited to, polyvinyl alcohol-based anti-fluid flow additives. For example, in one embodiment a polyvinyl alcohol fluid flow additive (such as "BA-10" available from BJ Services) may be used in an amount of between about 0.1% and about 3.0%, alternatively from about 0.1% to about 1.5% BWOC, although other amounts are possible.

Accelerators may also be optionally employed. In this regard, any additive/s suitable for well cementing may be used including, but not limited to, calcium chloride potassium chloride, sodium chloride, seawater, sodium silicate, sodium metasilicate, metakaolin or mixtures thereof. In one embodiment, between about 0.1% and about 4%, alternatively from about 0.1% to about 2% of "A-7" calcium chloride BWOC (available from BJ Services) may be employed in formulating a slurry, although other amounts are possible.

The disclosed natural fiber-containing cement compositions may also be optionally formulated to contain consolidating fibers, such as nylon or polypropylene fibers, to reduce the potential for cement debris formed under high stress conditions. Examples of suitable consolidating fibers include, but are not limited to, at least one of carbon fibers, nylon fibers, polypropylene fibers, or a mixture thereof.

Any dispersant additive/s suitable for facilitating the mixing of wet and dry materials in a slurry and/or activating dry materials may also be used including, but not limited to, dispersants such as naphthalene sulfonate, ethoxylated napthalene sulfonate or ketone-acetone sulfonate. Such additives may be particularly useful, for example, when lower water to cement ratios are employed. In one embodiment, between about 0.1% and about 3%, alternatively from about 0.1% to about 1.0% of acetone sulfonate, ethoxylated napthalene sulfonate, or naphthalene sulfonate (such as "CD-33," "CD-32" or "CD-31", respectively, available from BJ Services) BWOC is used, although other amounts are possible.

Low density additives may also be optionally employed. In this regard, any additives suitable for lowering slurry density may be used including, but not limited to, sodium silicate, sodium metasilicate, hollow microspheres, bentonite or mixtures thereof. In one embodiment, between about 1% and about 75%, alternatively from about 1% to about 50% of a lightweight additive such as hollow ceramic microspheres available as "LW-6" BWOC (available from BJ Services) may be employed in formulating a slurry, although other amounts are possible.

Set retarders may also be optionally used. Any set retarder composition suitable for retarding or otherwise delaying the setting of a natural fiber-containing cement, such as for increasing pumping time of a cement slurry, may be used. Examples include, but are not limited to, lignosulfonates, sugars, phosphonates, or mixtures thereof. In one embodiment, between about 0.1% and about 3%, alternatively from about 0.1% to about 1.0% of a sodium lignosulfonate cement retarder "R-3" BWOC (available from BJ Services) may be employed as a set retarder, although other amounts are possible.

It will be understood with the benefit of this disclosure that a cement slurry may also contain other conventional additives including but not limited to additives for controlling free water or solid separation, silica fume, glass or ceramic microspheres, perlite, biopolymers, etc.

When so desired, a cement slurry containing natural mineral fiber materials may be foamed utilizing a foaming agent, optional stabilizer, and an energizing phase. In this regard, any foaming agent and/or stabilizer suitable for creating a stable foamed natural fiber-containing cement slurry, may be employed in any amount suitable for obtaining a foamed cement slurry. In the case of salt water based cement slurries, a foaming agent may include, but is not limited to, oxyalkylated sulfates or ethoxylated alcohol sulfates, or mixtures thereof. In one embodiment "FAW-20" ethoxylated alcohol sulfate foaming agent available from BJ Services is utilized. Suitable salt water stabilizers include, but are not limited to, polyvinyl alcohol, sodium silicate, or mixtures thereof. In one embodiment, a polyvinyl alcohol stabilizer known as "BA-10" and available from BJ Services is used. In the case of fresh water based cement slurries, a foaming agent may include, but is not limited to, oxyalkylated sulfates or ethoxylated alcohol sulfates, or mixtures thereof. In one embodiment, "FAW-20" foaming agent available from BJ Services may be utilized. Suitable fresh water stabilizers include, but are not limited to, polyvinyl alcohol or sodium silicate, or mixtures thereof. "BA-10" stabilizer available from BJ Services may be used.

Any energizing phase composition suitable for forming a foamed fibrous mineral-containing cement may be employed including but not limited to gaseous material such as carbon dioxide, nitrogen, liquid petroleum gases (such as liquefied natural gas and liquefied petroleum gas, etc.), air or a mixture thereof. An energizing phase may be added to a mixture of cement, aqueous fluid, surfactant and stabilizer. The slurry density may be controlled with benefit of this disclosure by adjusting the amount of energizing phase added to an unfoamed cement slurry. For example, in one embodiment the density of a cement slurry may be adjusted from about 8 to about 15 lbs/gal by adding from about 1500 to about 25 standard cubic feet (SCF) of nitrogen gas at standard conditions per barrel (bbl) of unfoamed cement slurry, although any other amounts suitable for obtaining a foamed cement slurry are possible.

One or more defoaming additives may also be optionally used with natural mineral fiber-containing foamed cement slurries to prevent foaming during mixing and pumping of a foamed slurry. In this regard, any defoaming additive suitable for cementing operations may be employed including, but not limited to, glycol, alcohols or silicones, or mixtures thereof. In one embodiment, "FP-12L" defoaming additive available from BJ Services may be employed in an amount of from about 0.01 to about 0.5 gallons per sack ("GPS") concentration, in another embodiment from about 0.05 to about 0.1 GPS concentration, although other amounts are possible.

In either salt water or fresh water based cement slurries, any suitable energizing phase, including but not limited to nitrogen, $CO_2$, air, natural gas or mixtures thereof may be employed in a sufficient amount to achieve the desired density of cement, for example in an amount of between about 10 SCF/bbl and about 2000 SCF/bbl at standard conditions, in one embodiment between about 100 SCF/bbl to about 1000 SCF/bbl, although other amounts are possible. In one embodiment nitrogen may be employed.

It will also be understood with benefit of this disclosure that the disclosed natural fiber-containing cement operations may be employed with benefit in cementing operations performed in wells having conventional levels or risk of stress induced cement failure, or in wells in which situations other than those described herein create stress in set cement. In this regard, it will be understood that "cementing operations" as used herein means any type of wellbore cementing application known in the art including, but not limited to, long string cementing, liner cementing, inflatable/external packer cementing, squeeze cementing, plug back cementing, temporary plug cementing, casing repair cementing, zone isolation cementing, etc. Such operations include, but are not limited to, drilling, completion and remedial cementing operations, including those performed on existing completed wellbores, as well as those cementing operations performed during well abandonment operations.

Furthermore, it will be understood with benefit of this disclosure that although exemplary ranges and amounts of hydraulic cement, fibrous minerals and additives are described and illustrated herein, any other amounts of these components and/or other additives may be suitably employed where the benefits of the disclosed natural fiber-containing cement systems may be realized as described elsewhere herein. It will also be understood that although specific embodiments of cementing procedures using natural fiber-containing cement slurries have been described herein, a natural fiber-containing cement slurry may be mixed, pumped, spotted, or otherwise introduced into a wellbore and/or wellbore annulus in any manner known to those of skill in the art. Furthermore, a natural fiber-containing cement slurry may be formulated with benefit of this disclosure in any suitable manner known to those of skill in the art including, but not limited to, by continuous mixing, batch mixing, etc.

EXAMPLES

The following examples are illustrative and should not be construed as limiting the scope of the invention or claims thereof.

Example 1

Table 1 shows properties for several cement compositions, with and without natural mineral fibers added. With the addition of certain other minerals, (such as kaolinite, either natural or calcined), relatively high ratios of flexural strength to compressive strength may also be produced. This may be seen in Table 1 for cement compositions containing both natural mineral fibers (e.g., wollastonite or algamatolite) and meta kaolinite.

TABLE 1

| Slurry | Density, PPG | Meta-Kaolinite Fiber | Wollastonite Fiber | Algamatolite Fiber | Compressive Strength (23 h @ 135° F.) | Flexural Strength (23 h @ 135° F.) | FS:CS Ductility Ratio |
|---|---|---|---|---|---|---|---|
| "A" +0.4% Na M-Silicate | 13.3 | — | — | — | 1100 PSI | 295 PSI | 0.27 |
| "A" +0.4% Na M-Silicate | 13.3 | 15% | 35% | — | 600 PSI | 196 PSI | 0.33 |
| "A" +0.4% Na M-Silicate | 13.3 | 15% | — | 35% | 900 PSI | 314 PSI | 0.35 |

Example 2

Figure 2:
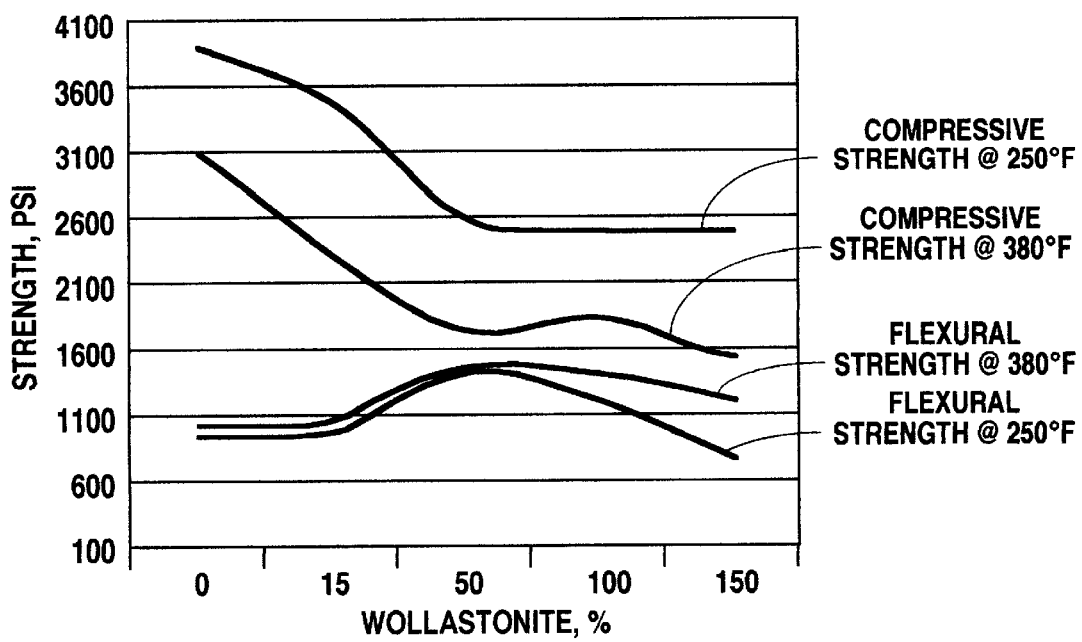
FIG. 2 illustrates values of flexural strength and compressive strength as a function of temperature and wollastonite concentration in cement.

FIG. 1 shows ratio of flexural strength/compressive strength as a function of wollastonite concentration in % BWOC at 250° F. and 380° F. Table 1 shows the surprising increase in the ratio of flexural strength/compressive strength ("FS/CS ratio"), with increasing amounts of wollastonite and increasing temperatures, e.g., above 200° F., by more than 50% as compared to conventional cements (having an average FS/CS ratio =0.25). FIG. 2 shows compressive strength ("CS") and flexural strength ("FS") values as a function of wollastonite concentration in % BWOC at 250° F. and 380° F. The wollastonite employed in this example is wollastonite-based fiber material from Brazil, and is available from the Latin American Region of BJ Services as "MPA-3.

It may be seen that with benefit of this disclosure, and using the methodology of this example, an appropriate amount of natural mineral fiber (e.g., wollastonite) greater than about 10% BWOC may be selected for a particular downhole temperature to achieve an surprising and advantageous ratio of flexural strength to compressive strength (e.g., ratio greater than about 0.35).

Example 3

Diffractograms were obtained for three cements with 40% silica flour and 0%, 50% and 100% wollastonite respectively cured at 380° F. for 48 hours, along with the diffractogram of wollastonite. None of the cement samples appeared to contain wollastonite. Quartz was detected in all samples. Tobermorite (Ca5Si6O16 (OH) 2×4H2O) was the principal cement component detected in all samples. The relative abundance of tobermorite increases with increasing "wollastonite" content. Xonotlite (Ca6Si6O17 (OH) 2) was present in both samples which contained "wollastonite". Xonotlite is a common hydrothermal cement component. Diopside (a pyroxene mineral) was detected in the two samples, which contain "wollastonite". Calcium aluminum ferrite (possibly brownmillerite) was detected in a minor quantity in the sample, which contained no "wollastonite".

While not wishing to be bound by theory, it is believed that natural mineral fibers (e.g., wollastonite, pyrophillite, algamatolite, mixtures thereof, etc.) become hydraulically active (reacting with cement) as temperatures increase above about 180° F. Additionally, at temperatures above about 240° F., it is believed that these fibers may participate in reactions that counteract strength retrogression of cements due to their higher silica content than oil well cements. Natural fibers at these temperatures react with cement faster, increasing the Ca/Silica ratio of cement during hydration and setting process, making their use advantageous at higher temperatures where "set cement" typically becomes more brittle. Dilution of cement (reduction of cement content) by the addition of natural fibers and higher amount of Tobermorite and faster generation of Xonolite (which has strength 25% lower than Tobermorite) are believed to be one cause for this increment in ductility. Depending on the nature of the fiber used and the testing temperature, other crystalline phases (Pectolite, Scawtite, Truscotite, etc.) may also be formed, but generally the strength effects is similar.

Example 4

Figure 3:
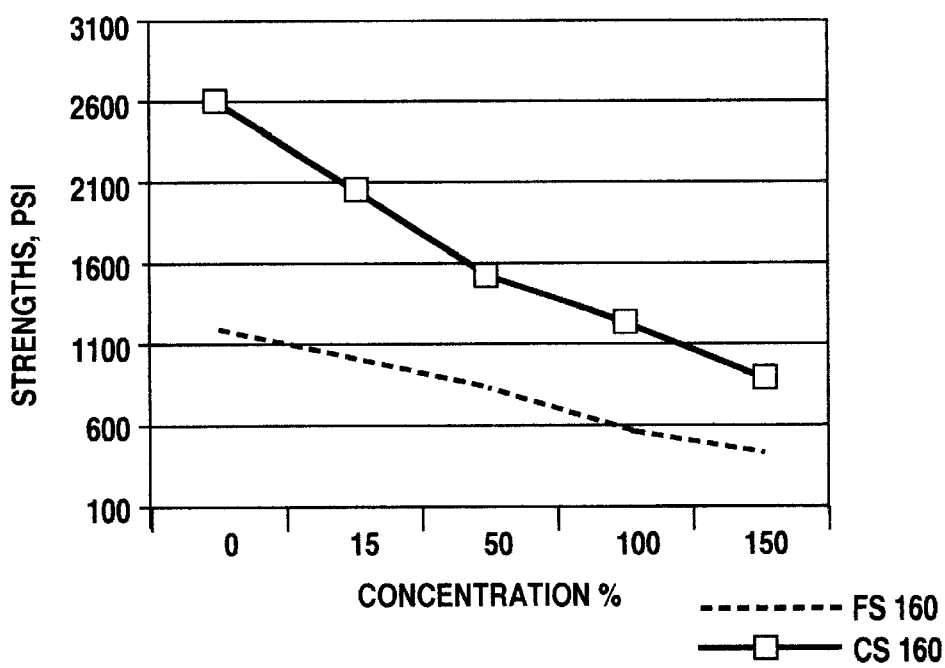
FIG. 3 illustrates values of flexural strength and compressive strength as a function of wollastonite concentration in cement at a temperature of 160° F.

Flexural strength and compressive strength were also evaluated at temperatures below 160° F. for varying concentrations of wollastonite. As shown in FIG. 3, in this temperature range (below about 170° F.), the Flexural Strength varies proportionally to the compressive strength as shown in FIG. 3. In FIG. 3, "FS" denotes flexural strength, and "CS" denotes compressive strength.

Example 5

In this example, a 15.0 pound per gallon ("PPG") cement slurry containing "A" hydraulic cement base, 35% BWOC silica, and natural 100% BWOC mineral micro fiber (wollastonite) was cured at a relatively low temperature (below 180° F.), but was later exposed to higher temperatures. As shown in FIG. 4, the hydration process restarted, allowing the cement to "reactivate" or regain compressive strength, instead of losing compressive strength due to retrogression. This behavior is advantageous for thermal cycling, such as seen in geothermal wells and cyclic steam injection wells, where temperature cycles tend to destroy the integrity of the cement matrix due to casing expansion/contraction cycles (tangential forces) and strength retrogression (radial-compressional forces).

Although particular exemplary embodiments of the disclosed compositions have been described and illustrated herein, it will be understood with benefit of this disclosure that benefits of the disclosed cement compositions and cementing methods may be realized in any type of wellbore cementing application, including in completion, remedial, workover, and/or abandonment cementing applications using cementing methods known in the art. Examples of specific applications include, but are not limited to, cementing casing and liner strings, inflatable packers, squeezing perforations and casing leaks, etc.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method of cementing within a wellbore, comprising:
   introducing a cement slurry comprising a hydraulic cement base and a natural mineral fiber into said wellbore; and
   allowing said cement slurry to cure within said wellbore to form a hardened cement composition within said wellbore;
   wherein a temperature of at least a first portion of said well bore is greater than about 180° F.;
   wherein said natural mineral fiber is present in said cement slurry in an amount greater than about 10% by weight of cement, and is also present in said cement slurry in an amount selected to be effective to result in at least a portion of said cured cement composition having a ratio of flexural strength to compressive strength that is greater than or equal to about 0.35 at said temperature of said at least a first portion of said well bore that is greater than about 180° F.; and
   wherein said natural mineral fiber comprises at least one calcium silicate natural mineral fiber.

2. The method of claim 1, wherein said calcium silicate natural mineral fiber comprises at least one of wollastonite, pyrophillite, algamatolite, or a mixture thereof.

3. The method of claim 1, wherein a temperature of said at least a first portion of said well bore is greater than about 200° F.; and wherein said natural mineral fiber is present in said cement slurry in an amount selected to be effective to result in at least a portion of said cured cement composition having a ratio of flexural strength to compressive strength that is greater than or equal to about 0.35 at said temperature of said at least a first portion of said wellbore that is greater than about 200° F.

4. The method of claim 1, wherein a temperature of said at least a first portion of said well bore is greater than about 240° F.; and wherein said natural mineral fiber is present in said cement slurry in an amount selected to be effective to result in at least a portion of said cured cement composition having a ratio of flexural strength to compressive strength that is greater than or equal to about 0.35 at said temperature of said at least a first portion of said wellbore that is greater than about 240° F.

5. The method of claim 1, wherein a temperature of said at least a first portion of said well bore is greater than about 380° F.; and wherein said natural mineral fiber is present in said cement slurry in an amount selected to be effective to result in at least a portion of said cured cement composition having a ratio of flexural strength to compressive strength that is greater than or equal to about 0.5 at said temperature of said at least a first portion of said wellbore that is greater than about 380° F.

6. The method of claim 1, wherein said natural mineral fiber is present in said cement slurry in an amount selected to be effective to result in at least a portion of said cured cement composition having a ratio of flexural strength to compressive strength that is greater than or equal to about 50% higher than the ratio of flexural strength to compressive strength of a cured conventional cement composition having substantially the same composition, but without said natural mineral fiber component, at said temperature of said at least a first portion of said wellbore that is greater than about 180° F.

7. The method of claim 1, wherein a temperature of said at least a first portion of said well bore is less than about 180° F. when said cement slurry is introduced into said wellbore and allowed to cure; and further comprising allowing the temperature of said at least a first portion of said wellbore to rise above about 180° F.; wherein said natural mineral fiber is present in said cement slurry in an amount selected to be effective to result in an increase in the compressive strength of at least a portion of said cured cement composition when said temperature of said at least a first portion of said wellbore is allowed to rise above about 180° F.

8. The method of claim 1, wherein said natural mineral fiber is present in said cement slurry in an amount of from greater than about 10% by weight of cement to about 150% by weight of cement.

9. The method of claim 1, wherein said well bore is a geothermal well or a steam injection well.

10. The method of claim 1, wherein said hydraulic cement base comprises Portland Cement.

11. A method of cementing within a wellbore, comprising:
introducing a cement slurry comprising a hydraulic cement base and wollastonite into said wellbore; and
allowing said cement slurry to cure within said wellbore to form a hardened cement composition within said wellbore;
wherein a temperature of at least a first portion of said well bore is greater than about 180° F.;
wherein said wollastonite is present in said cement slurry in an amount greater than about 10% by weight of cement, and is also present in said cement slurry in an amount selected to be effective to result in at least a portion of said cured cement composition having a ratio of flexural strength to compressive strength that is greater than or equal to about 0.35 at said temperature of said at least a first portion of said well bore that is greater than about 180° F.

12. The method of claim 11, wherein said hydraulic cement base comprises Portland Cement.

13. The method of claim 12, wherein a temperature of said at least a portion of said well bore is greater than about 200° F.; and wherein said wollastonite is present in said cement slurry in an amount selected to be effective to result in at least a portion of said cured cement composition having a ratio of flexural strength to compressive strength that is greater than or equal to about 0.35 at said temperature of said at least a first portion of said wellbore that is greater than about 200° F.

14. The method of claim 12, wherein a temperature of said at least a portion of said well bore is greater than about 240° F.; and wherein said wollastonite is present in said cement slurry in an amount selected to be effective to result in at least a portion of said cured cement composition having a ratio of flexural strength to compressive strength that is greater than or equal to about 0.35 at said temperature of said at least a first portion of said wellbore that is greater than about 240° F.

15. The method of claim 12, wherein a temperature of said at least a first portion of said well bore is greater than about 380° F.; and wherein said wollastonite is present in said cement slurry in an amount selected to be effective to result in at least a portion of said cured cement composition having a ratio of flexural strength to compressive strength that is greater than or equal to about 0.5 at said temperature of said at least a first portion of said wellbore that is greater than about 380° F.

16. The method of claim 12, wherein said wollastonite is present in said cement slurry in an amount selected to be effective to result in at least a portion of said cured cement composition having a ratio of flexural strength to compressive strength that is greater than or equal to about 50% higher than the ratio of flexural strength to compressive strength of a cured conventional cement composition having substantially the same composition, but without said wollastonite component, at said temperature of said at least a first portion of said wellbore that is greater than about 180° F.

17. The method of claim 12, wherein a temperature of said at least a first portion of said well bore is less than about 180° F. when said cement slurry is introduced into said wellbore and allowed to cure; and further comprising allowing the temperature of said at least a first portion of said wellbore to rise above about 180° F.; wherein said wollastonite is present in said cement slurry in an amount selected to be effective to result in an increase in the compressive strength of at least a portion of said cured cement composition when said temperature of said at least a first portion of said wellbore is allowed to rise above about 180° F.

18. The method of claim 12, wherein said wollastonite is present in said cement slurry in an amount of from greater than about 10% by weight of cement to about 150% by weight of cement.

19. The method of claim 12, wherein said well bore is a geothermal well or a steam injection well.

* * * * *